(12) United States Patent
Cho et al.

(10) Patent No.: US 10,087,805 B2
(45) Date of Patent: Oct. 2, 2018

(54) METHOD OF DETERMINING CORRECTING LOGIC FOR REACTING MODEL OF SELECTIVE CATALYTIC REDUCTION CATALYST, METHOD OF CORRECTING PARAMETERS OF REACTING MODEL OF SELECTIVE CATALYTIC REDUCTION CATALYST AND EXHAUST SYSTEM USING THE SAME

(71) Applicants: Hyundai Motor Company, Seoul (KR); FEV GMBH, Aachen (DE)

(72) Inventors: Ji Ho Cho, Yongin-si (KR); Jin Ha Lee, Seoul (KR); Bastian Holderbaum, Aachen (DE); Bernhard Lüers, Aachen (DE); Alexander Vovk, Aachen (DE)

(73) Assignees: HYUNDAI MOTOR COMPANY, Seoul (KR); FEV GMBH, Aachen (DE)

( * ) Notice: Subject to any disclaimer, the term of this patent is extended or adjusted under 35 U.S.C. 154(b) by 892 days.

(21) Appl. No.: 14/472,085

(22) Filed: Aug. 28, 2014

(65) Prior Publication Data

US 2015/0176456 A1   Jun. 25, 2015

(30) Foreign Application Priority Data

Dec. 23, 2013  (KR) .................. 10-2013-0161440

(51) Int. Cl.
  *F01N 11/00* (2006.01)
  *F01N 3/00* (2006.01)
(Continued)

(52) U.S. Cl.
  CPC ........... *F01N 3/208* (2013.01); *F01N 11/002* (2013.01); *F01N 2560/026* (2013.01);
  (Continued)

(58) Field of Classification Search
  CPC ............... F01N 3/208; F01N 11/002; F01N 2900/0402; F01N 2900/0408;
  (Continued)

(56) References Cited

U.S. PATENT DOCUMENTS 5,539,638 A * 7/1996 Keeler ................ F02D 41/1401
                                                          123/672
2003/0216855 A1* 11/2003 Liang ...................... F01N 3/208
                                                          701/114
2009/0013666 A1   1/2009 Jung

FOREIGN PATENT DOCUMENTS

CN         101454065 A    6/2009
DE   10 2007 059 888 A1   1/2009
(Continued)

*Primary Examiner* — Laert Dounis
*Assistant Examiner* — Kelsey Stanek
(74) *Attorney, Agent, or Firm* — Morgan, Lewis & Bockius LLP

(57) ABSTRACT

Disclosed are a method of determining a correcting logic for a reacting model of an SCR catalyst, a method of correcting parameters of the reacting model of the SCR catalyst and an exhaust system to which the methods are applied. The reacting model of the SCR catalyst is defined by m parameters and has n input variables, where m and n are natural numbers with n smaller than m. The reacting model of the SCR catalyst may be adapted to predict nitrogen oxide (NOx) concentration at a downstream of the SCR catalyst at the least.

20 Claims, 5 Drawing Sheets

(51) Int. Cl.
  *F01N 3/20* (2006.01)
  *F02D 41/14* (2006.01)
  *F02D 41/24* (2006.01)

(52) U.S. Cl.
  CPC ...... *F01N 2560/06* (2013.01); *F01N 2560/14* (2013.01); *F01N 2610/146* (2013.01); *F01N 2900/0402* (2013.01); *F01N 2900/0408* (2013.01); *F01N 2900/0411* (2013.01); *F01N 2900/0416* (2013.01); *F01N 2900/0601* (2013.01); *F01N 2900/1402* (2013.01); *F01N 2900/1602* (2013.01); *F01N 2900/1812* (2013.01); *F02D 41/1461* (2013.01); *F02D 41/1463* (2013.01); *F02D 41/1465* (2013.01); *F02D 41/2451* (2013.01); *F02D 2041/1433* (2013.01); *Y02T 10/24* (2013.01)

(58) Field of Classification Search
  CPC ..... F01N 2900/0411; F01N 2900/0416; F01N 2900/0601; F01N 2900/1402; F01N 2900/1602; F01N 2900/1812
  USPC .................................... 60/274, 286
  See application file for complete search history.

(56) References Cited

FOREIGN PATENT DOCUMENTS

| | | |
|---|---|---|
| JP | 2003-328732 A | 11/2003 |
| JP | 2009-180218 A | 8/2009 |
| JP | 2013-213465 A | 10/2013 |
| KR | 10-2008-0030163 A | 4/2008 |
| WO | WO 2008/006427 A1 | 1/2008 |

\* cited by examiner

METHOD OF DETERMINING CORRECTING LOGIC FOR REACTING MODEL OF SELECTIVE CATALYTIC REDUCTION CATALYST, METHOD OF CORRECTING PARAMETERS OF REACTING MODEL OF SELECTIVE CATALYTIC REDUCTION CATALYST AND EXHAUST SYSTEM USING THE SAME

CROSS-REFERENCE TO RELATED APPLICATION

The present application claims priority of Korean Patent Application Number 10-2013-0161440 filed on Dec. 23, 2013, the entire contents of which application are incorporated herein for all purposes by this reference.

BACKGROUND OF INVENTION

Field of Invention

The present invention relates to an exhaust system including a selective catalytic reduction (SCR) catalyst, and more particularly to a method of determining a correcting logic for a reacting model of an SCR catalyst, a method of correcting parameters of the reacting model of the SCR catalyst and an exhaust system using the same that corrects the parameters of the reacting model through sensitivity analysis of the reacting model which defines reaction of the SCR catalyst.

Description of Related Art

Generally, exhaust gas flowing out from an engine through an exhaust manifold is urged into a catalytic converter mounted at an exhaust pipe and is purified therein. After that, the noise of the exhaust gas is decreased while passing through a muffler and the exhaust gas is then emitted into the air through a tail pipe. The catalytic converter purifies pollutants contained in the exhaust gas. In addition, a particulate filter for trapping particulate matter (PM) contained in the exhaust gas is mounted in the exhaust pipe.

A selective catalytic reduction (SCR) catalyst is one type of such a catalytic converter. Reducing agent such as urea, ammonia, carbon monoxide and hydrocarbon (HC) reacts better with nitrogen oxide than with oxygen in the SCR catalyst.

An exhaust system of a vehicle provided with the SCR catalyst includes an urea tank and dosing module. The dosing module injects reducing agent such as urea into the exhaust gas passing through the exhaust pipe, and thereby the SCR catalyst purifies the nitrogen oxide efficiently.

The reducing agent injected from the dosing module is absorbed in the SCR catalyst, is released if the exhaust gas containing the nitrogen oxide passes through the SCR catalyst, and reacts with the nitrogen oxide. If excessive reducing agent is injected from the dosing module, a portion of the reducing agent is not absorbed in the SCR catalyst and is slipped. Ammonia is typically used as the reducing agent of the SCR catalyst. If the ammonia is slipped from the SCR catalyst, the slipped ammonia may cause stink and customers may have complaints. If the dosing module injects the reducing agent insufficiently, the nitrogen oxide contained in the exhaust gas cannot be sufficiently removed and is exhausted to the exterior of the vehicle. Therefore, amount of the reducing agent injected from the dosing module should be precisely controlled.

In a conventional method of determining the amount of the reducing agent, the amount of the reducing agent according to driving conditions is stored in a map through experiments and the amount of the reducing agent according to current driving condition is determined from the map. However, since there are a millions of driving conditions affecting the amount of the reducing agent, manufacturing the map is a tedious and expensive process.

In addition, since the driving condition changes very quickly, a measuring apparatus has error, and experiments cannot be conducted under all the driving conditions when manufacturing the map, the map itself has error. In order to reduce the errors, the map is corrected. However, it is very difficult to get over innate limitations such as error of the measuring apparatus and quick change of the driving condition.

Recently, researches for predicting reaction of an SCR catalyst using a reacting model of the SCR catalyst and determining injection amount of the reducing agent using the predicted results are in progress. Because the reacting model of the SCR catalyst is also determined through experiments or analysis, error exists between an actual value and a predicted value. In addition, since the conventional method of correcting the map is hard to be applied to a method of correcting the reacting model, it is demanded to develop a method of correcting the reacting model.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a method of determining a correcting logic for a reacting model of an SCR catalyst, a method of correcting parameters of the reacting model of the SCR catalyst and an exhaust system using the same having advantages of correcting the parameters of the reacting model through sensitivity analysis of the reacting model which defines reaction of the SCR catalyst.

According to various aspects of the present invention, a reacting model of an SCR catalyst is defined by m parameters and has n input variables, m and n being natural numbers with n smaller than m. The reacting model of the SCR catalyst may be adapted to predict nitrogen oxide (NOx) concentration at a downstream of the SCR catalyst at the least.

A method of determining a correcting logic for the reacting model of the SCR catalyst according to various aspects of the present invention may include: adjusting the input variables such that an error between the predicted NOx concentration and measured NOx concentration is to be a reference error under specific input variables; determining a correction coefficient such that the error between the predicted NOx concentration and the measured NOx concentration is to be minimized under the adjusted input variables; and repeating the adjustment of the input variables and the determination of the correction coefficient after changing the input variables.

The correcting logic may include at least one correction function and each of the at least one correction function may be a function of one input variable. The input variables may include exhaust flow rate, NOx concentration at an upstream of the SCR catalyst, injection amount of reducing agent, and/or temperature of the SCR catalyst.

The correcting logic may include a function of the exhaust flow rate, a function of the NOx concentration at the upstream of the SCR catalyst, and/or a function of the temperature of the SCR catalyst. The correcting logic may be defined as multiplication of the function of the exhaust flow rate, the function of the NOx concentration at the upstream of the SCR catalyst, and/or the function of the temperature of the SCR catalyst.

A method of correcting parameters of a reacting model of an SCR catalyst according to various other aspects of the present invention may include: calculating a correction coefficient by substituting current input variables into the correcting logic; and correcting the parameters according to the correction coefficient. The calculation of the correction coefficient may be performed if both of a correction necessary condition and a correction feasibility condition are satisfied.

The correction necessary condition may be satisfied if an error between the predicted NOx concentration and measured NOx concentration is greater than a predetermined value under the current input variables. The correction feasibility condition may be satisfied if current temperature of the SCR catalyst exists within a predetermined temperature range and current exhaust flow rate exists within a predetermined range of the exhaust flow rate.

The parameter P1 after the correction may be calculated from equation P1=P0*(1+Ec/Eref*f). Herein, P0 indicates the parameter before the correction, Ec indicates a current error, Eref indicates a reference error, and f indicates the correction coefficient.

An exhaust system according to various aspects of the present invention may include: an engine adapted to generate exhaust gas while burning fuel and air; an intake pipe connected to and supplying the air to the engine; an exhaust pipe connected to the engine, the exhaust gas flowing through the exhaust pipe; an SCR catalyst mounted on the exhaust pipe and adapted to reduce nitrogen oxide contained in the exhaust gas using a reducing agent; a reducing agent supplying device mounted on the exhaust pipe between the engine and the SCR catalyst and adapted to inject the reducing agent; an input variable detector adapted to detect n input variables, n being a natural number; and a controller including a reacting model of the SCR catalyst for predicting reaction of the SCR catalyst, calculating a target injection amount of the reducing agent by substituting the input variables into the reacting model of the SCR catalyst, and controlling the reducing agent supplying device according to the target injection amount of the reducing agent.

The controller may further include a correcting logic for correcting the parameters using an error between the predicted NOx concentration and detected NOx concentration The correcting logic may be obtained by adjusting the input variables such that the error is to be a reference error under specific input variables, determining a correction coefficient such that the error is to be minimized under the adjusted input variables, and repeating the adjustment of the input variables and the determination of the correction coefficient after changing the input variables.

The correcting logic may include at least one correction function and each of the at least one correction function may be a function of one input variable. The input variables may include exhaust flow rate, NOx concentration at an upstream of the SCR catalyst, injection amount of reducing agent, and/or temperature of the SCR catalyst.

The correcting logic may include a function of the exhaust flow rate, a function of the NOx concentration at the upstream of the SCR catalyst, and/or a function of the temperature of the SCR catalyst. The correcting logic may be defined as multiplication of the function of the exhaust flow rate, the function of the NOx concentration at the upstream of the SCR catalyst, and/or the function of the temperature of the SCR catalyst.

The controller may be adapted to calculate the correction coefficient by substituting the current input variables into the correcting logic and to correct the parameters according to the correction coefficient.

The parameter P1 after the correction may be calculated from equation P1=P0*(1+Ec/Eref*f). Herein, P0 indicates the parameter before the correction, Ec indicates a current error, Eref indicates a reference error, and f indicates the correction coefficient.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
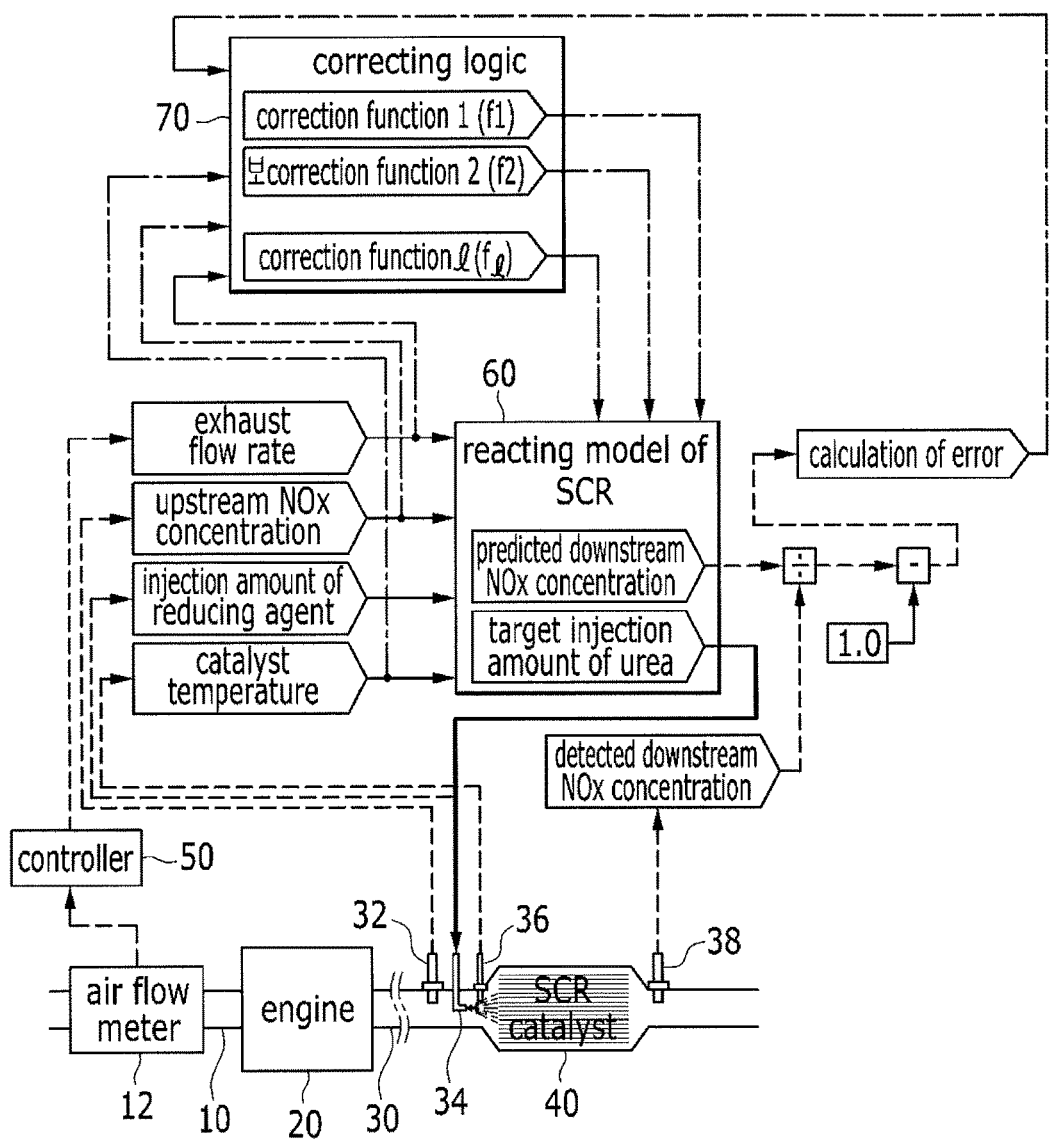
FIG. 1 is a schematic diagram illustrating an exemplary exhaust system according to the present invention.

FIG. 1 is a schematic diagram of an exhaust system according to various embodiments of the present invention. As shown in FIG. 1, nitrogen oxide in exhaust gas is removed while the exhaust gas generated in an engine 20 passes through a selective catalytic reduction (SCR) catalyst 40. If necessary, a particulate filter for trapping particulate matter contained in the exhaust gas and/or an oxidation catalyst for oxidizing carbon monoxide or hydrocarbon contained in the exhaust gas may be used. The exhaust system illustrated in FIG. 1 shows a simplified layout of an exhaust system to which spirit of the present invention can be applied, and it is to be understood that a range of the present invention is not limited to the exhaust system illustrated in FIG. 1.

The engine 20 burns air/fuel mixture in which fuel and air are mixed so as to convert chemical energy into mechanical energy. The engine 20 is connected to an intake manifold so as to receive the air in a combustion chamber, and is connected to an exhaust manifold such that the exhaust gas generated in combustion process is gathered in the exhaust manifold and is exhausted to the exterior. An injector is mounted in the combustion chamber so as to inject the fuel into the combustion chamber.

An intake pipe 10 is connected to the intake manifold of the engine 20 and is adapted to supply the air to the engine 20. An air flow meter 12 is mounted on the intake pipe 10 and detects flow rate of the air passing through the intake pipe 10.

An exhaust pipe 30 is connected to the exhaust manifold and is adapted to discharge the exhaust gas to the exterior of a vehicle.

The SCR catalyst 40 is mounted on the exhaust pipe 30 and is adapted to reduce the nitrogen oxide contained in the exhaust gas into nitrogen gas using reducing agent.

For these purposes, the exhaust system further includes a urea tank, a urea pump and a dosing module 34. For brief description, the urea tank and the urea pump are not illustrated in the drawings. In addition, urea is injected by the dosing module 34 in this specification but it is not limited that the dosing module 34 just injects the urea. That is, the dosing module 34 may inject ammonia and/or other suitable materials. Furthermore, reducing agent other than the ammonia can be injected together with the ammonia or by itself.

The dosing module 34 injects the urea pumped by the urea pump into the exhaust pipe 30. The dosing module 34 is mounted on the exhaust pipe 30 between the engine 20 and the SCR catalyst 40 and injects the urea into the exhaust gas before entering the SCR catalyst 40. The urea injected into the exhaust gas is decomposed into the ammonia and the decomposed ammonia is used as the reducing agent for the nitrogen oxide. It is to be understood in this specification and claims that the reducing agent injected by the dosing module 34 includes materials that will be the reducing agent.

Meanwhile, the urea tank, the urea pump and the dosing module described in this specification are examples of reducing agent supplying devices, and it is to be understood that a range of the present invention is not limited to the examples of the reducing agent supplying devices. That is, other types of the reducing agent supplying devices can be used in the present invention.

The exhaust system may further include a plurality of sensors including a first NOx sensor 32, a temperature sensor 36 and/or second NOx sensor 38.

The first NOx sensor 32 is mounted on the exhaust pipe 30 upstream of the SCR catalyst 40 and detects NOx concentration contained in the exhaust gas at an upstream of the SCR catalyst. In various exemplary embodiments, the NOx concentration at the upstream of the SCR catalyst 40 may be predicted based on exhaust flow rate, operation history of the engine, temperature of the SCR catalyst 40, injection amount of the reducing agent and/or amount of the reducing agent absorbed in the SCR catalyst 40, instead of using the first NOx sensor 32.

The temperature sensor 36 is mounted on the exhaust pipe 30 upstream of the SCR catalyst 40 or in the SCR catalyst 40, and detects the temperature of the exhaust gas at the upstream of the SCR catalyst 40 or in the SCR catalyst 40. For better comprehension and ease of description, the temperature of the SCR catalyst 40 described in this specification and claim may be temperature of the exhaust gas at the upstream of the SCR catalyst 40 or temperature of the exhaust gas in the SCR catalyst 40.

The second NOx sensor 38 is mounted on the exhaust pipe 30 downstream of the SCR catalyst 40 and detects the NOx concentration contained in the exhaust gas at a downstream of the SCR catalyst 40.

The exhaust system further includes a controller 50. The controller 50 controls operation of the injector and the dosing module 34 based on the detection of the first and second NOx sensors 32 and 38 and the temperature sensor 36.

The controller 50 may calculate exhaust flow rate based on flow rate of the air passing through the intake pipe 10.

The controller 50 further includes a reacting model 60 of the SCR catalyst 40 for predicting reaction of the SCR catalyst 40. The reacting model 60 is defined by m parameters. Herein, m is a natural number. For example, the parameters may includes one or more parameters related to speed of purifying the NOx, one or more parameters related to speed of oxidizing the ammonia, one or more parameters related absorbed amount of the ammonia, and so on. In addition, the reacting model 60 is adapted to predict the NOx concentration contained in the exhaust gas at the downstream of the SCR catalyst 40 and calculate target injection amount of the reducing agent (e.g., target injection amount of the urea) at the least. An error may be calculated by comparing the predicted NOx concentration with the NOx concentration detected by the second NOx sensor 38. In addition, the reacting model 60 has n input variables. Herein, n is a natural number that is smaller than m. The input variables may include, but not limited to, the exhaust flow rate, the NOx concentration contained in the exhaust gas at the upstream of the SCR catalyst 40, the injection amount of the reducing agent and the temperature of the SCR catalyst 40.

The controller 50 further includes a correcting logic 70 for correcting the parameters using the error. The correcting logic 70 may include at least one correction function f1, f2, . . . , and fl. The correcting logic 70 is adapted to calculate a correction coefficient using the input variables and the error. The controller 50 corrects the parameters according to the correction coefficient.

Figure 2:
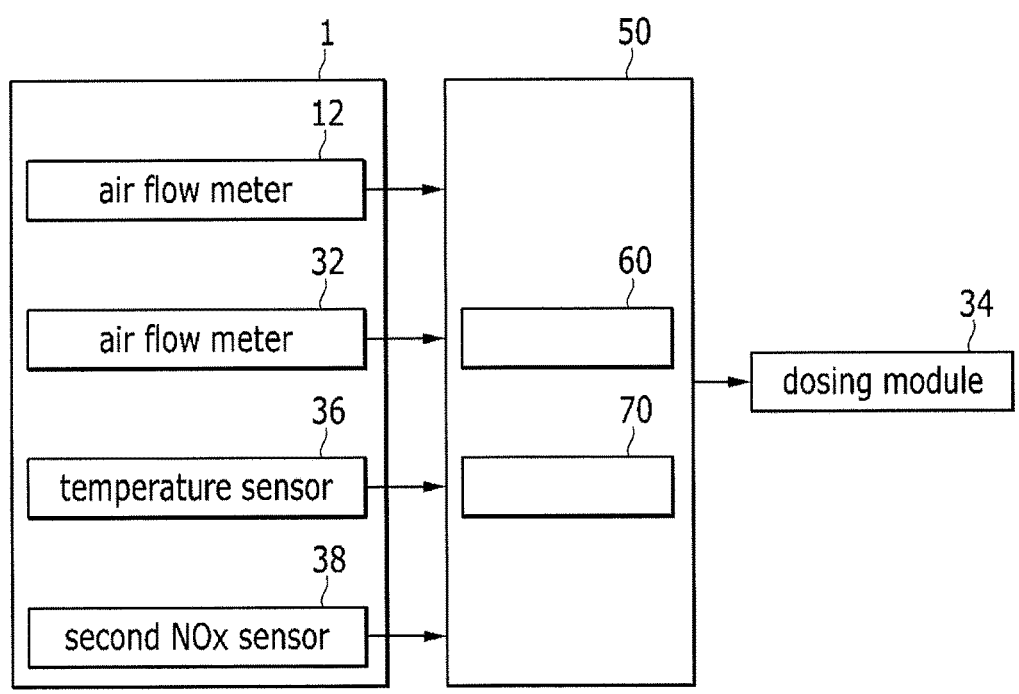
FIG. 2 is a block diagram illustrating a relationship of an input and output of a controller of an exemplary exhaust system according to the present invention.

FIG. 2 is a block diagram illustrating a relationship of an input and output of a controller of an exhaust system according to various embodiments of the present invention. As shown in FIG. 2, the input variables detected by an input variable detector 1 is transmitted to the controller 50, and the controller 50 controls the dosing module 34 based on the input variables. The input variable detector 1 includes the air flow meter 12, the first NOx sensor 32, the temperature sensor 36 and the second NOx sensor 38.

The air flow meter 12 detects the flow rate of the air passing through the intake pipe 10 and transmits a signal corresponding thereto to the controller 50. The controller 50 may calculate the exhaust flow rate based on the flow rate of the air.

The first NOx sensor 32 detects the NOx concentration contained in the exhaust gas at the upstream of the SCR catalyst 40 and transmits a signal corresponding thereto to the controller 50.

The temperature sensor 36 detects the temperature of the SCR catalyst 40 and transmits a signal corresponding thereto to the controller 50.

The second NOx sensor 38 detects the NOx concentration contained in the exhaust gas at the downstream of the SCR catalyst 40 and transmits a signal corresponding thereto to the controller 50.

The controller 50 calculates the target injection amount of the reducing agent by substituting the exhaust flow rate, the NOx concentration contained in the exhaust gas at the upstream of the SCR catalyst 40, the injection amount of the reducing agent and the temperature of the SCR catalyst 40 into the reacting model 60, and controls the dosing module 34 according to the target injection amount of the reducing agent.

The controller 50 predicts the NOx concentration contained in the exhaust gas at the downstream of the SCR catalyst 40 by substituting the exhaust flow rate, the NOx concentration contained in the exhaust gas at the upstream of the SCR catalyst 40, the injection amount of the reducing agent and the temperature of the SCR catalyst 40 into the reacting model 60. In addition, the controller 50 calculates the error between the predicted NOx concentration and the NOx concentration detected by the second NOx sensor 38.

Furthermore, the controller 50 calculates the correction coefficient for correcting the parameters by substituting the error, the exhaust flow rate, the NOx concentration contained in the exhaust gas at the upstream of the SCR catalyst 40 and the temperature of the SCR catalyst 40 into the correcting logic 70, and corrects the parameters according to the correction coefficient.

The controller 50 can be realized by one or more processors activated by a predetermined program, and the predetermined program can be programmed to perform each step of a method of determining a correcting logic for a reacting model of an SCR catalyst and a method of correcting parameters of a reacting model of an SCR catalyst according to exemplary embodiments of the present invention.

Meanwhile, the controller 50 may include a memory. The reacting model 60 and the correcting logic 70 may be stored in the memory. In addition, the memory may be a non-volatile memory.

Figure 3:
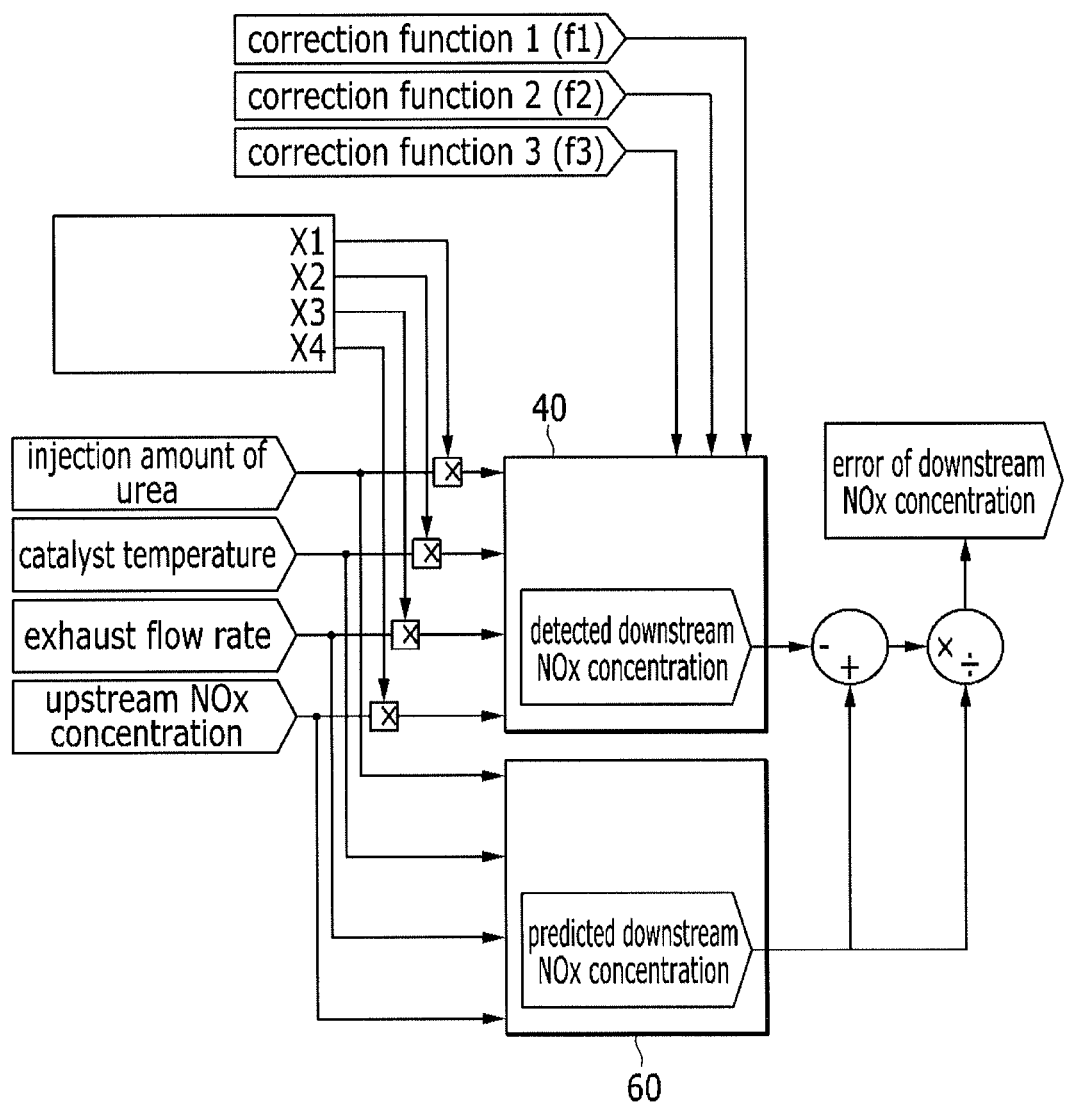
FIG. 3 is a block diagram illustrating an exemplary method of determining a correcting logic for a reacting model of an SCR catalyst according to the present invention.
Figure 4:
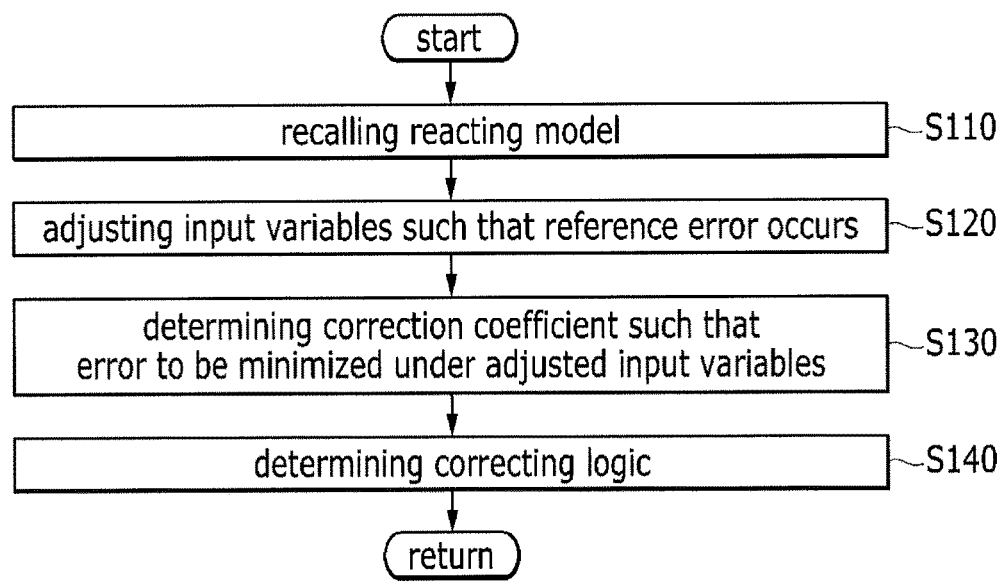
FIG. 4 is a flowchart illustrating an exemplary method of determining a correcting logic for a reacting model of an SCR catalyst according to the present invention.

FIG. 3 is a block diagram illustrating a method of determining a correcting logic for a reacting model of an SCR catalyst according to various embodiments of the present invention, and FIG. 4 is a flowchart of a method of determining a correcting logic for a reacting model of an SCR catalyst according to various embodiments of the present invention.

As shown in FIG. 3 and FIG. 4, a method of determining a correcting logic for a reacting model of an SCR catalyst according to various embodiments of the present invention begins with recalling the reacting model 60 stored in the memory at step S110.

If the reacting model 60 is recalled, the controller 50 substitutes specific input variables (e.g., the injection amount of the reducing agent, the temperature of the SCR catalyst 40, the exhaust flow rate and/or the NOx concentration contained in the exhaust gas at the upstream of the SCR catalyst 40) into the reacting model 60 so as to predict the NOx concentration contained in the exhaust gas at the downstream of the SCR catalyst 40. In addition, the controller 50 adjusts the input variables such that the error between the predicted NOx concentration and the NOx concentration contained in the exhaust gas at the downstream of the SCR catalyst 40 that is detected by the second NOx sensor 38 to be a reference error at step S120. The adjusted input variables include x1*the injection amount of the reducing agent, x2*the temperature of the SCR catalyst 40, x3*the exhaust flow rate and/or x4*the NOx concentration contained in the exhaust gas at the upstream of the SCR catalyst 40.

After that, the controller 50 determines the correction coefficient such that the error between the predicted NOx concentration and the measured NOx concentration is to be minimized under the adjusted input variables at step S130.

The correction coefficient is determined considering sensitivity of the reacting model 60 through the step S120 and the step S130.

The controller 50 performs the step S120 and the step S130 after changing the specific input variables. The controller 50 determines the correcting logic 70 according to the input variables at step S140 by repeating the step S120 and the step S130 a sufficient number of times.

It has developed that the correcting logic 70 determined through the step S110 to the step S140 includes one or more correction functions f1, f2, . . . , and fl and each correction function is a function of one input variable. Particularly, the correcting logic 70 for the reacting model 60 may include a function $f_{flow\ rate}$ of the exhaust flow rate, a function $f_{concentration}$ of the NOx concentration contained in the exhaust gas at the upstream of the SCR catalyst 40 and a function $f_{temperature}$ of the temperature of the SCR catalyst 40. In addition, the correction coefficient f may be defined as multiplication of one or more correction functions. For example, the correction coefficient f may be defined by the following equation:

$$f = f_{flow\ rate} * f_{concentration} * f_{temperature}$$

Hereinafter, referring to FIG. 5, a method of correcting parameters of a reacting model of an SCR catalyst will be described in detail.

Figure 5:
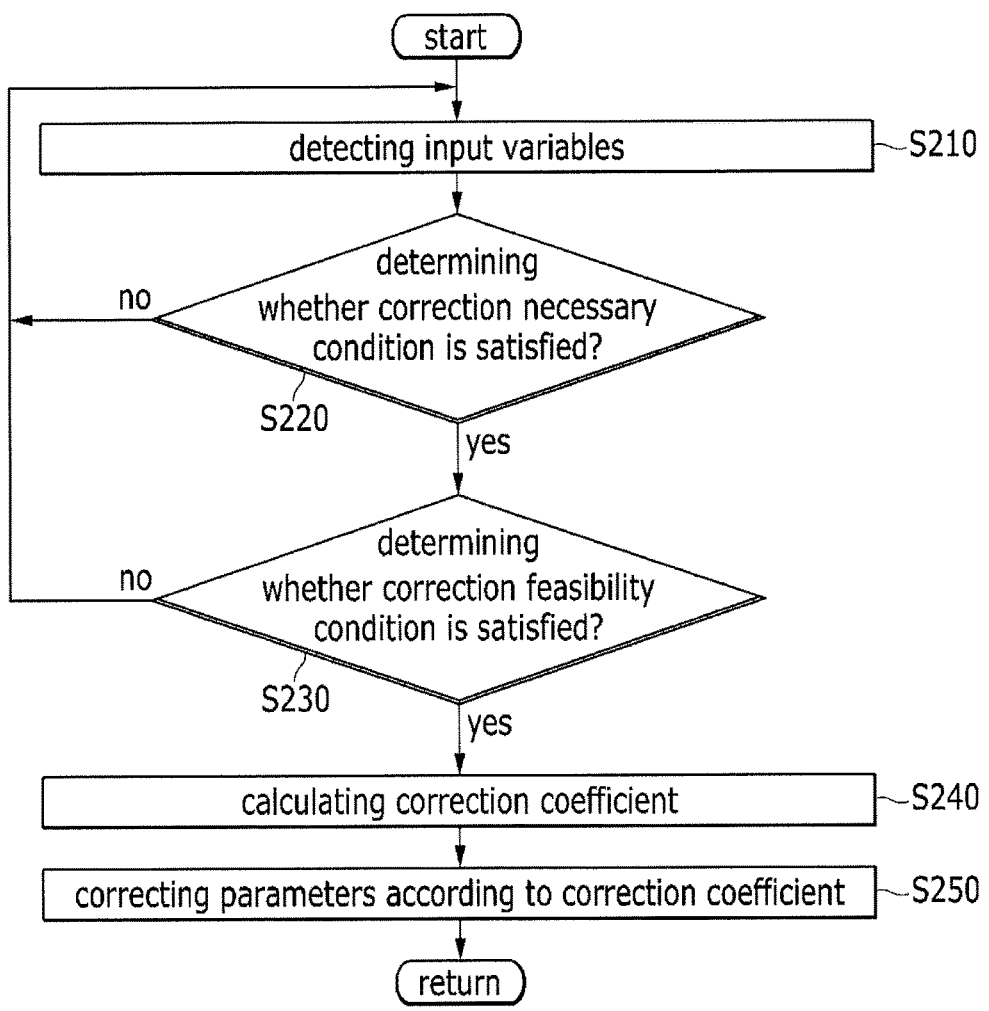
FIG. 5 is a flowchart illustrating an exemplary method of correcting parameters of a reacting model of an SCR catalyst according to the present invention.

FIG. 5 is a flowchart of a method of correcting parameters of a reacting model of an SCR catalyst according to various embodiments of the present invention. Herein, one or more correction functions included in the correcting logic 70 are determined in advance.

As shown in FIG. 5, the method of correcting the parameters of the reacting model of the SCR catalyst begins with detecting the input variables at step S210. The input variables may include the exhaust flow rate, the NOx concentration contained in the exhaust gas at the upstream of the SCR catalyst 40, the injection amount of the reducing agent and the temperature of the SCR catalyst 40.

If the input variables are detected, the controller 50 determines whether a correction necessary condition is satisfied at step S220. The correction necessary condition is satisfied if the error between the predicted NOx concentration and the NOx concentration detected by the second NOx sensor 38 is greater than a predetermined value under current input variables.

If the correction necessary condition is not satisfied at the step S220, the method returns to the step S210.

If the correction necessary condition is satisfied at the step S220, the controller 50 determines whether a correction feasibility condition is satisfied at step S230. The correction feasibility condition is satisfied if current temperature of the SCR catalyst 40 exists within a predetermined temperature range and current exhaust flow rate exists within a predetermined range of the exhaust flow rate. For example, if the temperature of the SCR catalyst 40 is too low or the exhaust flow rate is too small, the NOx concentration predicted by the reacting model 60 may be meaningless. If the parameters are corrected based on the meaningless value, reliability of correction may be low and unnecessary correction may be iterated. Therefore, the correction is performed only when the reaction of the SCR catalyst 40 predicted through the reacting model 60 can indicate the reaction occurring actually in the SCR catalyst 40.

If the correction feasibility condition is not satisfied at the step S230, the method returns to the step S210.

If the correction feasibility condition is satisfied at the step S230, the controller 50 calculates the correction coefficient at step S240 by substituting the current input variables into the correcting logic 70.

After that, the controller 50 corrects the parameters according to the correction coefficient at step S250. For example, each parameter may be corrected by following equation:

$$P1=P0*(1+Ec/Eref*f)$$

Herein, P1 indicates the parameter after the correction, P0 indicates the parameter before the correction, Ec indicates a current error, Eref indicates a reference error, and f indicates the correction coefficient.

As described above, the parameters of the reacting model may be corrected through sensitivity analysis of the reacting model according to various embodiments of the present invention.

Since the parameters are corrected through the sensitivity analysis of the reacting model, the reaction of the SCR catalyst can be precisely predicted regardless of errors of the sensors themselves. In addition, if the error between the predicted value of the reacting model and the detected values of the sensors occurs, the parameters of the reacting model can be corrected in real time.

For convenience in explanation and accurate definition in the appended claims, the terms "upstream" or "downstream", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of determining a correcting logic for a reacting model of a selective catalytic reduction (SCR) catalyst, wherein the reacting model of the SCR catalyst is defined by parameters and has input variables, the method comprising:
   determining, by a controller, nitrogen oxide (NOx) concentration at a downstream of the SCR catalyst and a target injection amount of a reducing agent based on the reacting model of the SCR catalyst;
   adjusting, by the controller, the input variables such that an error between the determined NOx concentration and measured NOx concentration is to be a reference error under specific input variables;
   determining, by the controller, a correction coefficient such that the error between the determined NOx concentration and the measured NOx concentration is to be minimized under the adjusted input variables;
   repeating, by the controller, the adjustment of the input variables and the determination of the correction coefficient after changing the input variables; and
   correcting, by the controller, the parameters of the reacting model according to the correction coefficient;
   controlling by the controller, an injection of the reducing agent according to the target injection amount determined from the corrected parameters of the reacting model.

2. The method of claim 1, wherein the correcting logic includes at least one correction function and each of the at least one correction function is a function of one input variable.

3. The method of claim 1, wherein the input variables include exhaust flow rate, NOx concentration at an upstream of the SCR catalyst, injection amount of the reducing agent, or temperature of the SCR catalyst.

4. The method of claim 3, wherein the correcting logic includes a function of the exhaust flow rate, a function of the NOx concentration at the upstream of the SCR catalyst, or a function of the temperature of the SCR catalyst.

5. The method of claim 4, wherein the correcting logic is defined as multiplication of the function of the exhaust flow rate, the function of the NOx concentration at the upstream of the SCR catalyst, or the function of the temperature of the SCR catalyst.

6. A method of correcting the parameters of the reacting model of the SCR catalyst,
   wherein the reacting model of the SCR catalyst is defined by the parameters and has the input variables, the reacting model of the SCR catalyst is adapted to determine the NOx concentration at the downstream of the SCR catalyst and the target injection amount of the reducing agent at the least, and the injection of the reducing agent is controlled by the controller according to the target injection amount, and
   wherein the correcting logic for correcting the parameters includes at least one correction function, each of the at least one correction function is a function of one input variable, the correcting logic is defined as multiplication of the at least one correction function, and the correcting logic is determined by the method of claim 1,
   the method of the correcting parameters of the reacting model of the SCR catalyst, comprising:
   calculating the correction coefficient by substituting current input variables into the correcting logic; and
   correcting the parameters according to the correction coefficient.

7. The method of claim 6, wherein the input variables include exhaust flow rate, NOx concentration at an upstream of the SCR catalyst, injection amount of the reducing agent, or temperature of the SCR catalyst.

8. The method of claim 7, wherein the correcting logic includes a function of the exhaust flow rate, a function of the NOx concentration at the upstream of the SCR catalyst, or a function of the temperature of the SCR catalyst.

9. The method of claim 6, wherein the calculation of the correction coefficient is performed when both of a correction necessary condition and a correction feasibility condition are satisfied.

10. The method of claim 9, wherein the correction necessary condition is satisfied when the error between the determined NOx concentration and the measured NOx concentration is greater than a predetermined value under the current input variables.

11. The method of claim 9, wherein the correction feasibility condition is satisfied when current temperature of the SCR catalyst exists within a predetermined temperature range and current exhaust flow rate exists within a predetermined range of the exhaust flow rate.

12. The method of claim 6, wherein a parameter P1 of the parameters after the correction is calculated from equation P1=P0*(1+Ec/Eref*f), wherein P0 indicates the parameter before the correction, Ec indicates a current error, Eref indicates a reference error, and f indicates the correction coefficient.

13. An exhaust system comprising:

an engine adapted to generate exhaust gas while burning fuel and air;

an intake pipe connected to and supplying the air to the engine;

an exhaust pipe connected to the engine, the exhaust gas flowing through the exhaust pipe;

an SCR catalyst mounted on the exhaust pipe and adapted to reduce nitrogen oxide contained in the exhaust gas using a reducing agent;

a reducing agent supplying device mounted on the exhaust pipe between the engine and the SCR catalyst and adapted to inject the reducing agent;

an input variable detector adapted to detect n input variables, n being a natural number; and a controller including a reacting model of the SCR catalyst for predicting reaction of the SCR catalyst, calculating a target injection amount of the reducing agent by substituting the input variables into the reacting model of the SCR catalyst, and controlling the reducing agent supplying device according to the target injection amount of the reducing agent, wherein the reacting model of the SCR catalyst is defined by m parameters, m being a natural number, and is adapted to predict NOx concentration at a downstream of the SCR catalyst at the least, and wherein the controller further includes a correcting logic for correcting the parameters using an error between the predicted NOx concentration and detected NOx concentration.

14. The exhaust system of claim 13, wherein the correcting logic is obtained by adjusting the input variables such that the error is to be a reference error under specific input variables, determining a correction coefficient such that the error is to be minimized under the adjusted input variables, and repeating the adjustment of the input variables and the determination of the correction coefficient after changing the input variables.

15. The exhaust system of claim 13, wherein the correcting logic includes at least one correction function and each of the at least one correction function is a function of one input variable.

16. The exhaust system of claim 13, wherein the input variables include exhaust flow rate, NOx concentration at an upstream of the SCR catalyst, injection amount of a reducing agent, and/or temperature of the SCR catalyst.

17. The exhaust system of claim 16, wherein the correcting logic includes a function of the exhaust flow rate, a function of the NOx concentration at the upstream of the SCR catalyst, and/or a function of the temperature of the SCR catalyst.

18. The exhaust system of claim 17, wherein the correcting logic is defined as multiplication of the function of the exhaust flow rate, the function of the NOx concentration at the upstream of the SCR catalyst, and/or the function of the temperature of the SCR catalyst.

19. The exhaust system of claim 13, wherein the controller is adapted to calculate the correction coefficient by substituting current input variables into the correcting logic and to correct the parameters according to the correction coefficient.

20. The exhaust system of claim 19, wherein a parameter P1 after the correction is calculated from equation P1=P0*(1+Ec/Eref*f), wherein P0 indicates the parameter before the correction, Ec indicates a current error, Eref indicates a reference error, and f indicates the correction coefficient.

* * * * *